11/25/86 OR 4,625,094

United States Patent [19]

Marhic et al.

[11] Patent Number: 4,625,094

[45] Date of Patent: Nov. 25, 1986

[54] PLASMA TORCHES

[75] Inventors: Gérard Marhic, Cergy; Didier Schaff, Auvers-sur-Oise; Francis Remy, Montigny-les-Cormeilles, all of France

[73] Assignee: L'Air Liquide, Societe Anonyme pour l'Etude et l'Exploitation des Procedes Georges Claude, Paris, France

[21] Appl. No.: 535,880

[22] Filed: Sep. 26, 1983

[30] Foreign Application Priority Data

Oct. 1, 1982 [FR] France ................................ 82 16512

[51] Int. Cl.[4] ................................................ B23K 9/00

[52] U.S. Cl. ...................... 219/121 PM; 219/121 PQ; 219/121 PN; 219/75; 313/231.31

[58] Field of Search ..... 219/121 P, 121 PM, 121 PN, 219/121 PP, 121 PQ, 76.16, 75, 74; 313/231.31, 231.41, 231.51

[56] References Cited

U.S. PATENT DOCUMENTS

| | | | |
|---|---|---|---|
| 2,960,594 | 11/1960 | Thorpe | 219/121 PP |
| 3,217,133 | 11/1965 | Mattmuller | 219/75 |
| 3,562,486 | 2/1971 | Hatch | 219/121 |
| 3,832,513 | 8/1974 | Klasson | 219/121 PQ |
| 4,024,373 | 5/1977 | Bykhovsky et al. | 219/121 P |
| 4,463,245 | 7/1984 | McNeil | 219/121 PQ |

FOREIGN PATENT DOCUMENTS 2275270 6/1974 France .

*Primary Examiner*—M. H. Paschall

*Attorney, Agent, or Firm*—Lee C. Robinson, Jr.

[57] ABSTRACT

This invention relates to plasma torches in which, the gas entering the electrode holder is divided into a plasmagenic gas flow and into a cooling gas flow by two series of openings drilled in one and the same metal element forming the electrode holder.

22 Claims, 3 Drawing Figures

FIG.1
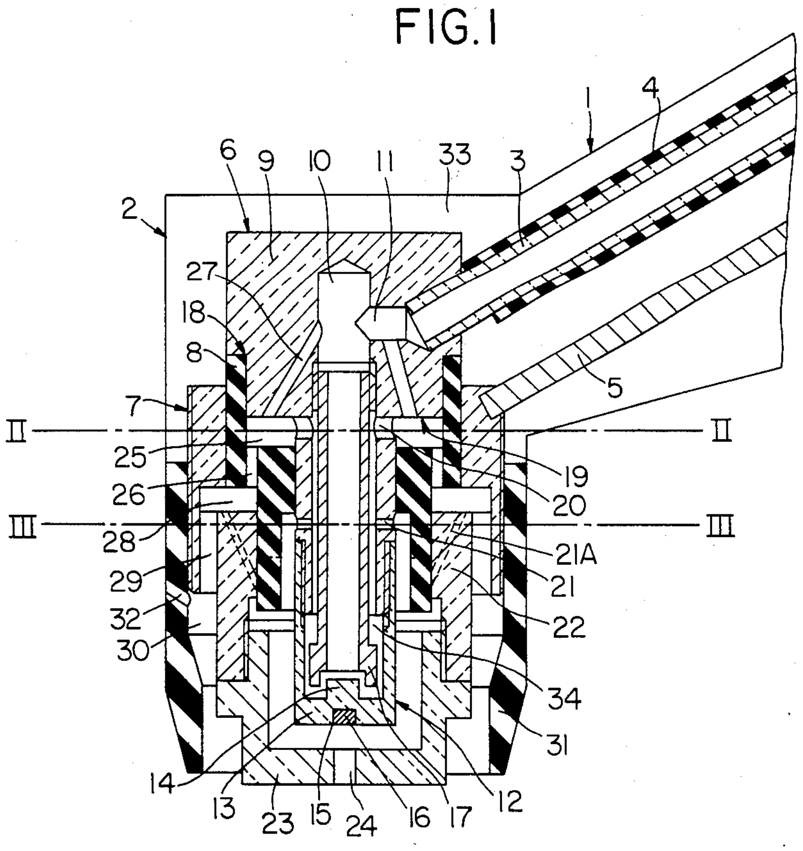
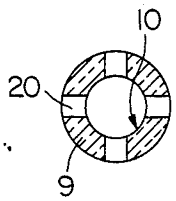
FIG.2
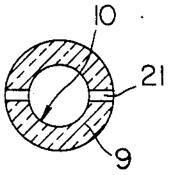
FIG.3

PLASMA TORCHES

BACKGROUND OF THE INVENTION

The present invention relates to plasma torches of the kind comprising a single gas supply pipe leading into metal electrode carrier means and dividing means for dividing the gas flow into a first flow of plasmagenic gas and a second flow of cooling gas. Torches of this kind will hereinafter be referred to as "monogas plasma torches".

It will be understood that the utilisation of a single circuit for supplying the plasmagenic gas and for cooling the main elements of the torch: electrode, nozzle, insulator, etc. . . . , is attractive because of the resulting uncomplicated structure.

However, the need for controlling the ratio between the two flows in precise manner despite substantial temperature variations occurring during operation, raises serious design difficulties. This is probably the reason why, to the Applicants' knowledge, no monogas plasma torch of any kind has been produced industrially, although their principle had been disclosed many years ago (see U.S. Pat. No. 4,024,373 and its corresponding French patent No. 2,275,270).

It is an object of the invention to provide a monogas plasma torch intended to be capable of operating in a satisfactory manner under actual conditions of utilisation.

SUMMARY OF THE INVENTION

To achieve this and other objects the invention consists in a plasma torch of the aforesaid kind, wherein said dividing means comprise two series of orifices formed in the electrode carrier means or in metal nozzle carrier means.

In an embodiment which assures particularly effective cooling of the electrode, a tubular baffle is provided within the electrode carrier means, which firstly directs the entering gas on to the active part of the electrode and then towards the two series of orifices. In this case, in order to lower the temperature of the cooling gas, this latter may be guided between a nozzle support and an annular skirt provided with at least one drilling for intake of ambient air, and/or a complementary passage may connect the gas inlet to a point of the cooling circuit situated downflow of the said baffle.

BRIEF DESCRIPTION OF THE DRAWINGS

One embodiment of the invention will now be described with reference to the accompanying drawings by way of example, in which:

FIG. 1 is a view in axial section of a manual plasma cutting torch in accordance with the invention, and FIGS. 2 and 3 are cross-sections of the electrode carrier means taken, respectively, along the lines II—II and III—III of FIG. 1.

DETAILED DESCRIPTION OF THE PREFERRED EMBODIMENT

The plasma cutting torch illustrated in the drawings comprises a handle 1 and, at its end, a cutting head 2 which forms a body of revolution around an axis X—X. To simplify the description, the axis XX will be assumed to be vertical and the head 2 to be downwardly directed.

The handle 1 contains a single tube 3 for feed of gas and of cutting current surrounded by an insulating sheath 4, and an electric cable 5. The head 2 contains a first metal assembly 6 connected electrically to the tube 3, a second metal assembly 7 connected electrically to the cable 5, and an insulator 8 interposed between these assemblies 6 and 7.

The assembly 6 comprises three hollow elements:

- an electrode carrier 9 which has a blind axial bore 10 open at its lower extremity and the other end of which is in communication with the tube 3 via a radial gas inlet 11,
- a non-consumable electrode 12 formed by a cup 13 whose upper edge is screwed to the lower extremity of the electrode holder 9 and the bottom of which has an upwardly directed projection 14. This projection is provided with a blind seat 15 open at the bottom which receives an insert 16, for example of zirconium, and
- a tubular baffle 17 the upper end of which is screwed into the pipe 10 of the electrode carrier 9, just below the gas inlet 11, and the lower end of which is enlarged to fit over the projection 14 of the electrode at a small distance from the same.

The electrode carrier 9 has a stepped external shape: in the area of the gas inlet 11, its upper portion terminates in a horizontal shoulder 18 and is followed by an intermediate portion of slightly smaller diameter; a second horizontal shoulder 19 connects the latter to a lower portion of distinctly smaller diameter, approximately equal to the external diameter of the cup 13. Four radial orifices 20 situated at 90° from each other, pass through the electrode carrier 9 just below the shoulder 19, and two orifices 21 of smaller diameter, which are also radial, pass through this electrode carrier just above the upper edge of the cup 13.

The second metal assembly 7 comprises two elements, being a tubular nozzle carrier 22 and a nozzle 23 in the form of a cup the top edge of which is screwed to the lower end of the nozzle carrier and the bottom of which is transpierced by an axial orifice 24.

The insulator 8 formed from an appropriate insulating material, has three parts: an upper part engaged on the intermediate portion of the electrode carrier 9 and impinging against the shoulder 18, an intermediate part of greater thickness which delimits an annular chamber 25 with the shoulder 19 and is transpierced by a series of longitudinal passages 26, and a lower part which with an annular gap surrounds the electrode carrier in the area of the orifices 21. The chamber 25 is also connected directly to the upper end of the passage 10 of the electrode carrier by one or more complementary passages 27.

The nozzle carrier 22 comprises an upper part engaged over the intermediate and upper parts of the insulator 8, a thicker intermediate part engaged over the lower part of this insulator, and a lower part receiving the nozzle. The intermediate part of the nozzle carrier delimits an annular chamber 28 with that of the insulator, and is also transpierced by a series of longitudinal passages 29. These latter open into a final annular chamber 30 delimited internally by the lower portion of the nozzle carrier 22 and by the nozzle, and externally by an insulating skirt 31 screwed or secured by another means to the upper portion of the nozzle carrier. The skirt 31 is transpierced by several venting holes 32 sloping inwards and downwards.

The torch is completed by an insulating covering 33 of plastics material which forms the outer part of the handle 1 and of the head 2 up to the level of the top edge of the skirt 31.

In operation, the assembly 6 is raised to an appropriate potential compared to the piece which is to be cut (not illustrated) by means of the tube 3, the assembly 7 is raised to an intermediate potential by means of the cable 5, and an appropriate gas, for example compressed air, is directed into the tube 3.

In essence, the gas enters the passage 10 via the inlet 11, descends through the baffle 17, passes over the projection 14 of the electrode and rises again in the annular space 34 present between the cup 13 and the baffle 17, and then between the latter and the wall of the passage 10.

A comparatively low proportion (for example 10%) of the gas emerges from the annular space 34 through the two holes 21 to produce an injection of plasmagenic gas into the annular gap provided at this level between the electrode holder 9 and the insulator 8, then into the annular chamber left free under this latter between the nozzle 23 and the cup 13. This plasmagenic gas issues from the head 2 via the central orifice 24.

The residue of the gas which had reached the annular space 34 is utilised to cool the head 2 and in particular the nozzle 23. This gas emerges from the electrode holder via the orifices 20 and passes consecutively into the annular chamber, the passages 26, the annular chamber 28, the passages 29 and the annular chamber 30 from which it is discharged downwards into the surrounding atmosphere. A particular flow of gas passes direct from the inlet 11 to the chamber 25 via the passages 27 of the electrode carrier, and the flow of the cooling gas into the chamber 30 draws in a substantial volume of ambient air through the holes 32 of the skirt 31.

It is thus apparent that the gas allowed to enter via the tube 3 substantially has the initial function of cooling the electrode 12. A part of this gas heated by the electrode, and determined by the ratio between the total cross-sections of the orifices 20 on the one hand and of the orifices 21 on the other hand, is derived to form the plasmagenic gas. During operation, this latter thus has a high temperature unaffected by the possible variations of the temperature of the gas entering through the tube 3. This is advantageous, since it is known that the temperature of the plasmagenic gas affects the cutting performance of the torch, by improving the same when it increases. The fraction of the flow emerging via the orifices 21 may be controlled in a precise manner since all the orifices 20 and 21 are drilled in one and the same component, which expands in a uniform manner. This would remain valid moreover if the electrode carrier were formed by several elements having expansion coefficients close to each other. Furthermore, these orifices and in particular the orifices 21, may easily be made with a very small diameter since they are drilled into a metal element. By contrast, the passages 26 of the insulator 8 which merely serve the purpose of guiding the cooling gas, may have a distinctly greater diameter than that of the orifices 20, since their diameter is not critical.

The fresh gas entering the cooling circuit downstream of the orifices 20 via the passages 27 and the fresh air drawn in via the holes 32, render it possible to obtain a cooling gas at sufficiently low temperature at every level to play its part in effective manner. In particular, the gas emerging from the passages 27 renders it possible to keep the insulator 8 at a lower temperature than the softening point of particular plastics materials, which is highly advantageous for quantity production. Again, the fact that passages 27 are drilled in the same metal element as the orifices 20 and 21 allows of satisfactory control over the gas fraction diverted in this manner.

As a modification, and although this actually appears to be less advantageous, the two series of orifices forming the flow divider could be formed in one or two metal elements forming the nozzle carrier means. In this case, the electrode holder would no longer comprise the orifices 21 and the whole of the gas contained in the annular space 34 would emerge through the orifices 20 for partial re-injection into the plasmagenic gas chamber. The principle of this modification has been sketched in FIG. 1, in which dash-dotted lines have been used to show passages 21A connecting the chamber 28 to the plasmagenic gas chamber and drilled into the nozzle carrier 22. The lower part of the insulator 8 is omitted to allow of this connection. In this modification, the overall gas flow is divided by the passages 29 and 21A which are all formed in the same metal element 22.

It should be observed that the design of the torch in accordance with the invention renders it possible to impart any desirable orientation to the orifices 20 and 21.

We claim:

1. A plasma torch comprising: a nozzle carrier, an electrode carrier separate from said nozzle carrier but connected thereto, at least one of said carriers including an integral portion of uniformly expandable material, a gas feed pipe communicating with said electrode carrier, and dividing means for dividing gas from said pipe into a first flow of plasmagenic gas and into a second flow of cooling gas, said dividing means including a first series of cooling gas orifices and a second series of plasmagenic gas orifices, both said series of orifices being formed in the uniformly expandable material portion of said one carrier; said first series of orifices being spaced from said second series of orifices, said first series of orifices being part of a flow path for the cooling gas, said second series of orifices being part of a flow path for the plasmagenic gas, the flow path for the cooling gas being separate from the flow path for the plasmagenic gas.

2. A plasma torch as recited in claim 1, wherein said electrode carrier defines an axis and said first series of orifices is spaced from said second series of orifices along the axis of the electrode carrier.

3. A plasma torch comprising: electrode carrier means having a tubular shape and made of a uniformly expandable metal; an electrode secured to the electrode carrier means; a single gas feed pipe connected to the electrode carrier means; nozzle carrier means; an insulator between the electrode carrier means and the nozzle carrier means; a nozzle secured to the nozzle carrier means and defining a plasmagenic gas chamber with the electrode carrier means; and dividing means for dividing gas from said pipe into a first flow of plasmagenic gas and into a second flow of cooling gas, said dividing means including a first series of cooling gas orifices and a second series of plasmagenic gas orifices, both said series of orifices extending through the uniformly expandable metal of the electrode carrier means; said first series of orifices being spaced from said second series of orifices; cooling gas guiding passage means defining a cooling gas flow path and for guiding the cooling gas issuing from said cooling gas orifices around said nozzle carrier means, said cooling gas guiding passage means communicating with said first series of orifices; and plasmagenic gas guiding passage means defining a plasmagenic gas flow path and for guiding the plasmagenic gas issuing from said plasmagenic gas orifices to said chamber, said plasmagenic gas guiding passage means communicating with said second series of orifices, the cooling gas flow path being separate from the flow path for the plasmagenic gas.

4. A plasma torch as recited in claim 3, wherein said electrode carrier defines an axis and said first series of orifices is spaced from said second series of orifices along the axis of the electrode carrier.

5. A plasma torch comprising: electrode carrier means having a tubular shape; an electrode secured to the electrode carrier means; a single gas feed pipe connected to the electrode carrier means; orifice means in said electrode carrier means for receiving gas from the feed pipe; nozzle carrier means made of a uniformly expandable metal and connected to the electrode carrier means; a nozzle secured to the nozzle carrier means and defining a plasmagenic gas chamber with the electrode carrier means; and dividing means for dividing the gas from said orifice means into a first flow of plasmagenic gas and a second flow of cooling gas, said dividing means including a first series of orifices opening into said chamber and a second series of orifices opening around said nozzle carrier means, both series of orifices communicating with said orifice means and extending through the uniformly expandable metal of said nozzle carrier means; said first series of orifices being spaced from said second series of orifices, said first series of orifices being part of a flow path for the plasmagenic gas, said second series of orifices being part of a flow path for the cooling gas, the flow path for the cooling gas being separate from the flow path for the plasmagenic gas.

6. A plasma torch, comprising: a gas feed pipe; an electrode carrier with a bore, the bore communicating with the gas feed pipe, the electrode carrier having a first plurality of orifices and a second plurality of orifices, the first plurality of orifices being spaced from the second plurality of orifices, the orifice size for the orifices in the first and second pluralities of orifices changing substantially uniformly with temperature changes; an electrode attached to the electrode carrier; a nozzle carrier with a gas passage; a nozzle attached to the nozzle carrier; wherein the nozzle carrier is arranged so that the first plurality of orifices communicates with the gas passage; wherein the first plurality of orifices and the gas passage define a flow path for cooling gas; wherein the electrode carrier and at least one of the nozzle and the nozzle carrier define a chamber communicating with the second plurality of orifices; wherein the second plurality of orifices and the chamber define a flow path for plasmagenic gas; and wherein the flow path for plasmagenic gas is separate from the flow path for cooling gas.

7. A plasma torch as recited in claim 6, wherein the electrode carrier includes a tubular baffle arranged to direct gas flowing through the bore initially onto the electrode and subsequently toward the first and second pluralities of orifices.

8. A plasma torch as recited in claim 6, further comprising an annular skirt disposed around the nozzle carrier, the skirt having a hole for drawing in ambient air, the hole communicating with the flow path for cooling gas.

9. A plasma torch as recited in claim 6, wherein the electrode carrier includes a complementary passage communicating between a point upstream of the bore and a point downstream of the first plurality of orifices.

10. A plasma torch as recited in claim 6, wherein the bore defines an axis and the first plurality of orifices is spaced from the second plurality of orifices along the axis of the bore.

11. A plasma torch, comprising: a gas feed pipe; an electrode carrier with a bore, the bore communicating with the gas feed pipe, the electrode carrier having a first plurality of orifices and a second plurality of orifices, the first plurality of orifices being spaced from the second plurality of orifices, the orifice size for the orifices in the first and second pluralities of orifices changing substantially uniformly with temperature changes; an electrode attached to the electrode carrier; an insulator with a first gas passage; a nozzle carrier with a second gas passage; a nozzle attached to the nozzle carrier; wherein the insulator is interposed between the electrode carrier and the nozzle carrier; wherein the insulator is arranged so that the first plurality of orifices communicates with the first gas passage; wherein the nozzle carrier is arranged so that the second gas passage communicates with the first gas passage; wherein the first plurality of orifices, the first gas passage, and the second gas passage define a flow path for the cooling gas; wherein the electrode carrier and at least one of the insulator, the nozzle carrier, and the nozzle define a chamber communicating with the second plurality of orifices; wherein the second plurality of orifices and the chamber define a flow path for plasmagenic gas; and wherein the flow path for plasmagenic gas is separate from the flow path for cooling gas.

12. A plasma torch as recited in claim 11, wherein the insulator includes additional gas passages, the first gas passage and the additional gas passages being substantially parallel to the bore.

13. A plasma torch as recited in claim 11, wherein the electrode carrier includes a tubular baffle arranged to direct gas flowing through the bore initially onto the electrode and subsequentially toward the first and second pluralities of orifices.

14. A plasma torch as recited in claim 11, further comprising an annular skirt disposed around the nozzle carrier, the skirt having a hole for drawing in ambient air, the hole communicating with the flow path for cooling gas.

15. A plasma torch as recited in claim 11, wherein the electrode carrier includes a complementary passage communicating between a point upstream of the bore and a point downstream of the first plurality of orifices.

16. A plasma torch as recited in claim 11, wherein the bore defines an axis and the first plurality of orifices is spaced from the second plurality of orifices along the axis of the bore.

17. A plasma torch, comprising: a gas feed pipe; an electrode carrier with a bore, the bore communicating with the gas feed pipe; an electrode attached to the electrode carrier; a nozzle carrier having a first plurality of orifices and a second plurality of orifices, the first plurality of orifices being spaced from the second plurality of orifices, the orifice size for the orifices in the first and second pluralities of orifices changing substantially uniformly with temperature changes, the bore communicating with each of the first and second pluralities of orifices; a nozzle attached to the nozzle carrier; wherein the first plurality of orifices defines a flow path for the cooling gas; wherein the electrode carrier and at least one of the nozzle and the nozzle carrier define a chamber communicating with the second plurality of orifices; wherein the second plurality of orifices and the chamber define a flow path for plasmagenic gas; and wherein the flow path for plasmagenic gas is separate from the flow path for cooling gas.

18. A plasma torch as recited in claim 17, wherein the electrode carrier includes a tubular baffle arranged to direct gas flowing through the bore initially onto the electrode and subsequently toward the first and second pluralities of orifices.

19. A plasma torch as recited in claim 18, wherein the electrode carrier includes a complementary passage communicating between a point upstream of the bore and a point downstream of the baffle.

20. A plasma torch as recited in claim 17, further comprising an annular skirt disposed around the nozzle carrier, the skirt and the nozzle carrier defining an additional chamber, the additional chamber and the first plurality of orifices defining the flow path for cooling gas.

21. A plasma torch as recited in claim 20, wherein the skirt has a hole for drawing in ambient air, the hole communicating with the flow path for cooling gas.

22. A plasma torch, comprising: a gas feed pipe; an electrode carrier with a bore, the bore communicating with the gas feed pipe; an electrode attached to the electrode carrier; an insulator with a gas passage; a nozzle carrier having a first plurality of orifices and a second plurality of orifices, the first plurality of orifices being spaced from the second plurality of orifices, the orifice size for the orifices in the first and second pluralities of orifices changing substantially uniformly with temperature changes, the bore communicating through the gas passage in the insulator with each of the first and second pluralities of orifices; a nozzle attached to the nozzle carrier, wherein the insulator is interposed between the electrode carrier and the nozzle carrier; wherein the first plurality of orifices defines a flow path for the cooling gas; wherein the electrode carrier and at least one of the nozzle and the nozzle carrier define a chamber communicating with the second plurality of orifices; wherein the second plurality of orifices and the chamber define a flow path for plasmagenic gas; and wherein the flow path for plasmagenic gas is separate from the flow path for cooling gas.

* * * * *